United States Patent [19]

Brosch et al.

[11] 4,356,016
[45] Oct. 26, 1982

[54] COOLING TUBE ALIGNMENT MEANS AND PROCESS THEREFOR

[75] Inventors: Eric J. Brosch, Grand Rapids; William H. Sterrett, Toledo, both of Ohio

[73] Assignee: Manville Service Corporation, Denver, Colo.

[21] Appl. No.: 274,946

[22] Filed: Jun. 18, 1981

[51] Int. Cl.³ .......................................... C03B 37/025
[52] U.S. Cl. ....................................... 65/1; 65/10.1; 65/12
[58] Field of Search ............................. 65/10.1, 12, 1

[56] References Cited

U.S. PATENT DOCUMENTS 3,492,104  1/1970  Glaser ................................. 65/12 X
3,997,309  12/1976  Harris ..................................... 65/12
4,055,406  10/1977  Slonaker et al. ..................... 65/10.1

Primary Examiner—Robert L. Lindsay, Jr.
Attorney, Agent, or Firm—Robert M. Krone; Joseph J. Kelly; Richard K. Thomson

[57] ABSTRACT

A fiberizing bushing having a plurality of cooling tube alignment members spaced from the tip plate of the bushing wherein only a small portion of the space is filled with a refractory cement.

2 Claims, 3 Drawing Figures

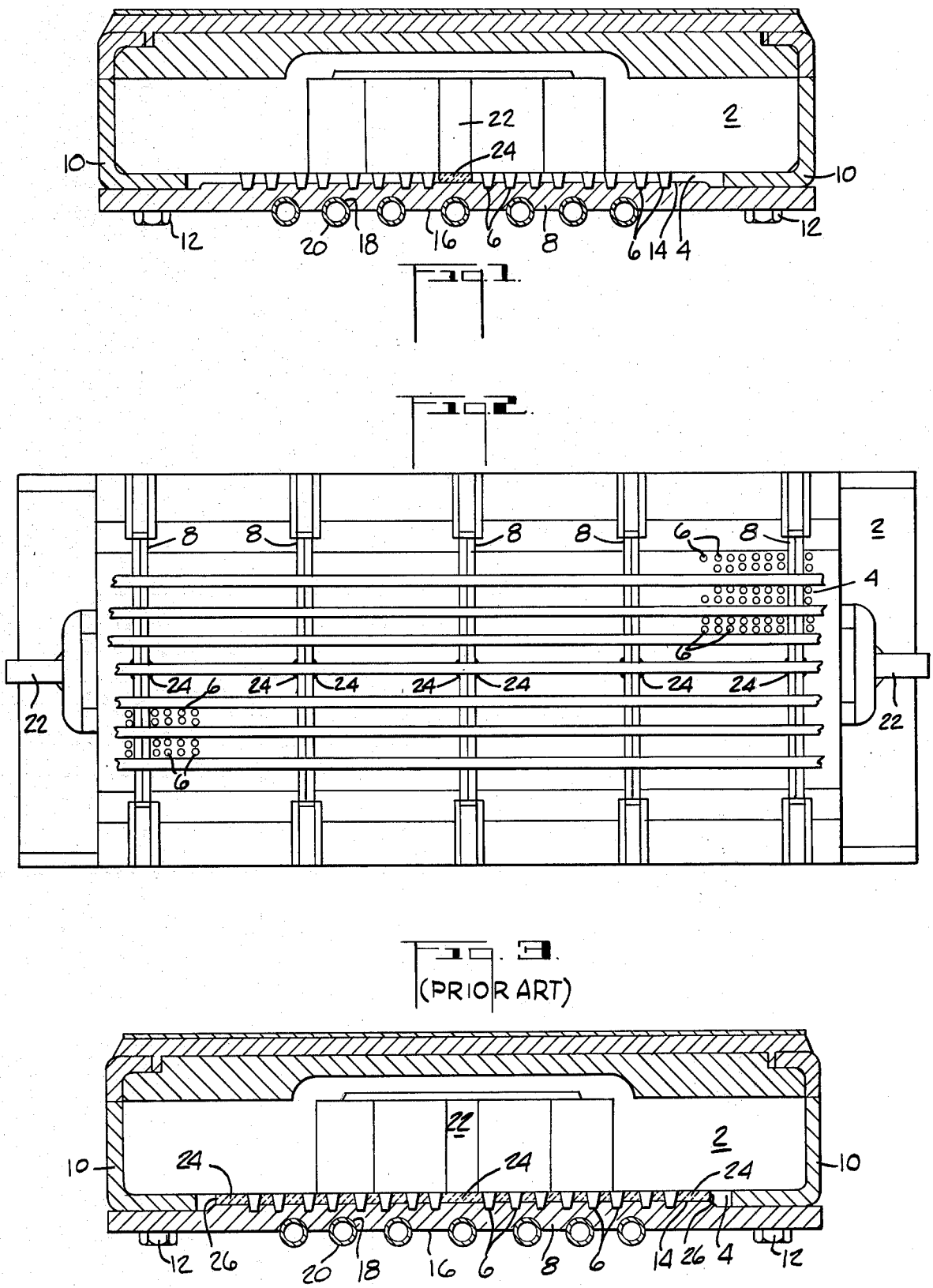

COOLING TUBE ALIGNMENT MEANS AND PROCESS THEREFOR

TECHNICAL FIELD

The present invention relates to a spacer for positioning cooling tubes beneath the orifice tip plate of a fiberizing bushing used to make fibers from a molten material, such as glass.

BACKGROUND OF THE INVENTION

A well known method of making glass fibers is described and illustrated in U.S. Pat. No. 3,997,309. As shown in this patent, proper alignment of the cooling tubes is maintained by the use of alignment members which have notches at proper intervals across their length. It has been conventional to mount the alignment members spaced from the bottom of the bushing tip plate and to fill the space across the width of the bushing with a refractory cement. It was considered that filling this space with a refractory cement aided in obtaining a uniform tip temperature.

SUMMARY OF THE INVENTION

In accordance with the present invention, only a relatively small part of the space between the alignment members and the bottom of the bushing tip plate is filled with a refractory cement. After this was done, the temperature profile of the bushing improved. In the preferred embodiment of the invention, only the space between the alignment members and the portion of the bottom of the bushing tip plate between the central two rows of tips is filled with a refractory cement.

It is an object of this invention to fill the space between an alignment member and the bottom of a bushing tip plate with only a minimum amount of refractory cement.

BRIEF DESCRIPTION OF THE DRAWINGS

FIG. 1 is a view in cross section of a bushing showing the relative location of the alignment member, the cooling tubes and the tips;

FIG. 2 is a bottom view of FIG. 1; and

FIG. 3 is a view similar to FIG. 1 showing the prior art.

DESCRIPTION OF THE INVENTION

In FIGS. 1 and 2, there is illustrated a bushing 2 having a bottom 4 with a plurality of tips 6. A plurality of alignment members 8 are secured at spaced intervals to the framework 10 of the bushing by suitable means such as bolts 12. The upper surface 14 of each alignment member 8 is spaced a predetermined distance from the bottom 4 of the bushing 2. The lower surface 16 of each alignment member 8 has a plurality of notches 18 in which the cooling tubes 20 are located. The bushing 2 has ears 22 which are adapted to be connected to an electrical power source.

The space between the upper surface 14 of each alignment member 8 and the bottom 4 of the bushing 2 is filled with a refractory cement 24. In accordance with this invention, the refractory cement 24 extends for only a short distance along the upper surface 14 of the alignment member 8. In the preferred embodiment, illustrated in FIG. 1, the refractory cement 24 is located only above the central cooling tube 20 and between the two central rows of tips 6.

In FIG. 3, there is illustrated the prior practice where the refractory cement 24 extended from the outer side 26 of one first row of tips 6 to the outer side 26 of the other first row of tips 6.

What I claim is:

1. In a fiberizing bushing wherein alignment members are secured to the framework of said bushing so that a space exists between the upper surface of each of said alignment members and the bottom of said bushing in which are located a plurality of rows of tips and wherein each of said alignment members has a plurality of notches in its bottom surface for receiving cooling tubes, the improvement comprising:
   (a) filling only a small portion of said space with a refractory cement locating said refractory cement in the portion of said space above a central cooling tube and between two central rows of tips.

2. In a fiberizing bushing wherein alignment members are secured to the framework of said bushing so that a space exists between the upper surface of each of said alignment members and the bottom of said bushing in which are located a plurality of rows of tips and wherein each of said alignment members has a plurality of notches in its bottom surface for receiving cooling tubes, the improvement comprising:
   (a) a refractory cement filling a small portion of said space locating said refractory cement in the portion of said space above a central cooling tube and between two cental rows of tips.

* * * * *